March 14, 1961  E. WALTHER ET AL  2,974,460
METHOD OF AND APPARATUS FOR SEALING THE
LAYERS OF THE SEALING BANDS OF CARTONS
Filed July 15, 1957  2 Sheets-Sheet 1

Inventors:
RUDOLF ERHARDT WALTHER
AND
WALTER WERNER DÄMMIG
Bailey, Stephens & Huettig
ATTORNEYS Inventors:
RUDOLF EHRHARDT WALTHER
AND
WALTER WERNER DÄMMIG

United States Patent Office 2,974,460
Patented Mar. 14, 1961

2,974,460

METHOD OF AND APPARATUS FOR SEALING THE LAYERS OF THE SEALING BANDS OF CARTONS

Erhardt Walther and Werner Dammig, Forchheim, Upper Franconia, Germany, assignors to Regnitz Konstruktionsgesellschaft m.b.H., Forchheim, Upper Franconia, Germany Filed July 15, 1957, Ser. No. 673,554

Claims priority, application Germany Dec. 8, 1952

2 Claims. (Cl. 53—373)

The present invention relates to a process and apparatus for closing cartons by heat sealing. It is intended especially for packets for containing foodstuffs and the like which must be impervious to water vapor and to odor, although it may be used for any other containers requiring a tight seal. More particularly the invention relates to a method of sealing of cartons folded up from a pre-cut blank. Such blanks may be provided with edge bands or marginal strips, which, when the carton is prefolded, are arranged in a superimposed relation to form straight sealing bands, preferably a single sealing band, as shown, for example, in Lange Patent No. 2,692,078. Along the length of the sealing band, the number of layers of marginal strips of which the sealing band consists varies. There may be in the most elementary case, for example, a portion at each end of the sealing band formed by four layers as a result of the edge bands of one end tab folded in between the other edge bands, while a central portion may consist of these other two edge band layers alone. Thus the total thickness of the sealing band is not uniform along its length. If a carton is provided with a continuous all-around edge band which is folded to form a single sealing band, these variations may become far more considerable, as sealing band portions may be present that are made up of eight, twelve or even more layers.

In order to make the superimposed marginal strip layers in this sealing band stick to one another avoiding leaks in the form of passages at the folding edges of the edge bands so as to obtain a seal which is impervious to the passage of water vapor and to odor in spite of the varying number of layers, special processes are required, and the object of the present invention is to provide such a process.

According to the present invention, a method of sealing the marginal strip layers of the sealing bands of cartons in which the said sealing bands have portions made up of varying numbers of marginal strip layers coated with a thin layer of thermoplastic material, comprises a first step of heating up the prefolded sealing band and simultaneously pressing its layers into parallel relation, a second step of sealing the sealing band by repeatedly applying pressure thereto to provide a positive seal between the surfaces of any two adjacent sealing band layers regardless of variations in the number of layers present in subsequent portions of the sealing band along its length and of differences of sealing band total thickness, a third step of progressively bending the sealing band in stages toward one of the adjacent container walls, and a fourth step of folding the sealing band against said adjacent wall.

The process according to the invention can be carried out advantageously in such manner that the sealing pressure providing a positive seal regardless of differences of sealing band total thickness acts on the band only in the region of a very narrow zone, preferably at the base or root of the band.

Pressure application in a narrow zone will not only result in a positive sealing regardless of the fact that the folding edges of the edge bands within the sealing band extend at an angle to the sealing band, but also prevent relative displacement of the layers within the sealed zone.

In addition, pressure application in a narrow zone at the root or base of the sealing band will permit the bending of the edge band in said third step along a non-sealed zone farther remote from the body of the carton or container and to leave the sealed zone of the sealing band in the position in which it had previously been sealed in said second step. This precludes the sealed zone from suffering damage which would be the case if the sealed zone itself was subjected to bending.

Consequently, it is another object of this invention to provide a method as described above, wherein said second step comprises the sealing of sealing bands by repeatedly applying pressure to a narrow zone extending over the whole length of the sealing band at its root or base for the purpose described, said third step comprises the progressive bending in stages of a non-sealed zone of the sealing band farther remote from the container than the sealed zone, and said fourth step comprises folding of the sealing band along a line farther remote from the container than said sealed zone so that the sealed zone retains the position in which it has been sealed and the remaining part of the sealing band is preferably given an inclination towards the adjacent container wall which it may contact with its extreme edge.

An apparatus for carrying out the process of the invention includes a heating station with parallel heating elements for heating up the prefolded sealing band and simultaneously pressing its layers into parallel relation; a pressing and sealing station for repeatedly applying pressure to the sealing band preferably to a narrow zone thereof, to provide a positive seal between the surfaces of any two adjacent sealing band layers, regardless of variations in the number of layers present in the sealing band or differences of sealing band total thickness and of the fact that the folding edges of the edge bands within the sealing band extend at an angle to the sealing band, in order to prevent relative displacement of the layers within the sealed zone; said second station comprising pairs of cooperating rollers arranged at opposite sides of the sealing band, one of said elements being spring biased against the other and the peripheral surfaces of both elements being preferably narrow to effect sealing along said narrow zone; a progressive bending station for bending the sealing band in stages toward one of the adjacent container walls, preferably along a non-sealed zone farther remote from the body of the container than the sealed zone, comprising pairs of cooperating rollers having conical surfaces and being arranged at opposite sides of the path of the sealing band, the angle of inclination of the conical surfaces of subsequent pairs of rollers being progressively increased, and the peripheral surface of the lower rollers having preferably a cylindrical portion the width of which is at least substantially equal to the width of the actually sealed zone; and a final folding station for folding the sealing band against said adjacent wall preferably along a line farther remote from the container than said sealed zone, comprising two rollers one of which folds the sealing band against the adjacent wall while the other counteracts the force exerted by said first roller on the container in a direction perpendicular to the path of the container.

The invention will be described further by way of example with reference to the accompanying drawings, in which.

Figure 1:
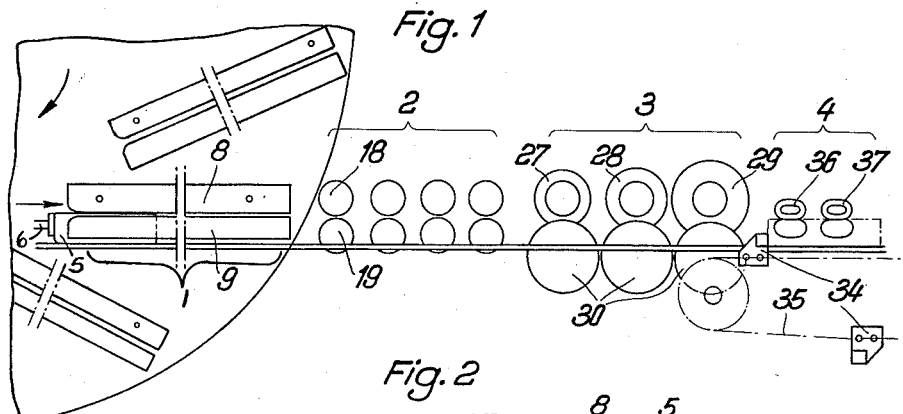
Figure 1 is a diagrammatic side view of a preferred form of apparatus for carrying out the invention.

The apparatus illustrated in Figure 1 includes a heating station 1, a succeeding station 2 for repeatedly applying pressure to a narrow zone of the sealing band to provide a positive seal between the surfaces of any two adjacent sealing band layers, a bending station 3 following this and a final folding station 4.

Figure 2:
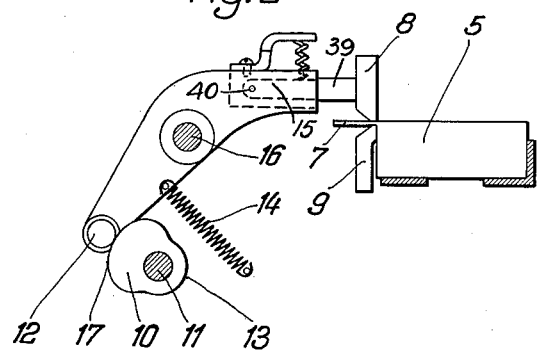
Figure 2 is a detailed cross-sectional view of a heating device which forms part of the apparatus.

Filled and prefolded cartons 5 having a prefolded sealing band are pushed past heating elements 8, 9 of the heating station 1 at spaced intervals by a plunger 6. The sealing bands 7 of the cartons are accommodated between the heating elements 8, 9, as shown in Figure 2. The upper heating element 8 is swingably mounted on a lever 15 carried on a shaft 16, so that it presses the sealing band 7 against the lower heating element 9. The lower end of the lever 15 is provided with a roller 12 which is resiliently biased against the cam 10 mounted on cam shaft 11 by a spring 14. The heating elements 8, 9 are preferably in the form of rails as shown in Figure 1. In the position shown in Figure 2, a raised part 17 of the cam 10 is pressing the heating element 8 in a clockwise direction in opposition to the pull of the spring 14 against the heating element 9 and the band 7 laying between them. In the position where its lower part 13 abuts the roller 12, the spring 14 draws the lower end of the lever 15 in an anti-clockwise direction so that the heating element 8 is lifted away from the heating element 9. This movement of the lever 15 and heating element 8 is synchronized with the forward movement of the cartons.

In order to insure positive pressure application to the sealing band under treatment, the arm 39 which carries the heating element 8 may be pivotally connected to lever arm 15, as at 40, for limited swinging movement toward element 9 over a narrow angle and biased in a downward direction by a compression spring (not shown) interposed between arm 39 and a part integral with, or rigidly secured to lever arm 15, whereby a resilient pressure is applied by heating element 8 to the sealing band under treatment, when the assembly is in working position as illustrated in Figure 2. It will be noted that, with this arrangement, heating element 8 will adjust its position with reference to heating element 9 to the sealing band total thickness and that no adjustment is required when changing to a carton type having a sealing band of a different thickness.

The effect of the heating station is described hereinafter. As the sealing band enters the heating station and heating element 8 is brought to engagement therewith, element 8 will adjust its position with reference to fixed heating element 9 so that its distance from the latter is equal to the maximum thickness of the sealing band under treatment, i.e. to the thickness of that portion of the sealing band which is made up of the largest number of layers. As the heating elements are rigid, those portions of the sealing band having a total thickness less than the distance between the heating elements are not being pressed by the heating elements. By applying pressure to the sealing band through the heating elements, the layers of the first set of sealing band portions will be aligned in a parallel and contacting relation, while the layers of the second set of portions will be aligned in almost parallel relation leaving some of the layers at a small angle with reference to the sealing band. Due to the heating action, the surfaces of any two adjacent layers which are resting against each other under pressure will adhere to each other. It will, however, be noted that an actual sealing does not take place as gaps and leaks especially in the form of tiny passages are left at least at the second set of sealing band portions, which passages left after exit from heating station 1 are to be subsequently closed in pressing and sealing station 2.

As the operation of heating station 1 is intermittent and the rest of the work stations operate practically continuously, the operation is capable of being performed at a greater rate in stations 2 to 4 than in heating station 1. Provisions therefor may be made for retaining a container under treatment in heating station 1 for a longer period of time than in any one of the remaining stations. This can be achieved by providing a set of heating station assemblies 1 and feeding heated containers to station 2 from alternate heating station 1 assemblies, and replacing each heated carton by a new carton as it is withdrawn from such assembly for further treatment. Such heating station assemblies may for example be mounted on a wheel that is driven continuously or intermittently at a suitable speed, and in which a heated carton is discharged and replaced whenever a heating station assembly passes, for instance the lowest point, whereby each carton is retained in a heating assembly for the period of time which corresponds to one complete revolution of the wheel.

The same result may be obtained by using a heating station assembly having sufficient length to handle several containers at a time, in which case each container can be retained as many times longer in the heating station than in the remaining stations as there are containers handled by the heating station at one time. In the illustrated embodiment, the heating elements 8, 9 in every case are made long enough to insure thorough heating of the whole length of each band 7. Thus, between the heating elements 8, 9 there are the sealing bands 7 of a number of cartons, which are each moved forward by the plunger 6 in each working stroke.

Figure 3:
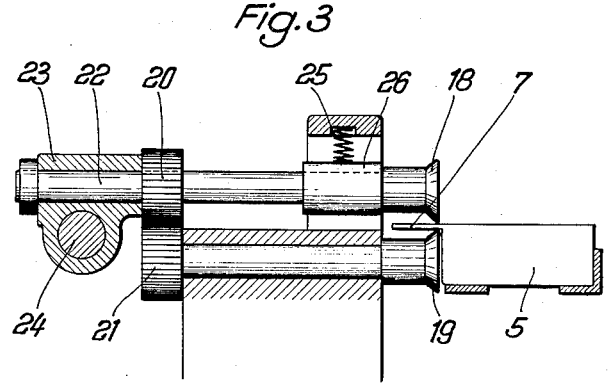
Figure 3 is a cross-sectional view of one of the pairs of rollers for repeatedly applying pressure to a narrow zone of the sealing band to provide a positive seal between the surfaces of any two adjacent sealing band layers, the drive and bearings thereof being shown in section.

After passing heating station 1, the cartons reach the succeeding station 2. This station consists of pairs of rollers, four pairs being shown in the present embodiment. Each pair has an upper roller 18 and a lower roller 19. Figure 3 shows such a pair of rollers with their bearings. As can be seen, the lower roller 19 is carried on a shaft rotatable in a fixed bearing, while the upper roller 18 has a shaft 22 rotatable in a cross bearing 23, capable, in turn, of swinging about the axis 24. The drive of the two rollers 18, 19 is by means of gear transmission 20, 21. The upper roller 18 is pressed downwards against the roller 19 by a compression spring 25 acting through a slide block bearing 26. The spring for each pair of rollers, in the direction of carton advancement, is stronger than the spring for the preceding pair of rollers. Figure 2 shows that in the present embodiment the action of rollers 18 and 19 on sealing band 7 is preferably limited to a narrow zone at the root thereof as shown on the drawing.

The operation of pressing and sealing station 2 is as follows. As described above, a sealing band of a container leaving heat station 1 has a first set of portions wherein the layers forming the band are in parallel relation and the surfaces of adjacent layers adhere to each other to some degree although there may be no tight seal; and a second set of layers wherein the layers are not oriented completely in parallel and no appreciable degree of adherence between layers is present. However, owing to the previous heating action the thermoplastic coated layers are capable of being readily sealed when brought into contact with each other under pressure while simultaneously cooled by ambient temperature. The pressing action of rollers 18, 19 results in parallel orientation of the layers of the previously mentioned second set of sealing band portions, except, of course, in those parts which are adjacent to folding edges within the sealing band. This is achieved by aid of the resilient bias on rollers 18 by spring 25 so that pressure is exerted on any portion of the sealing band regardless of how few layers may be present in the respective portions of the second set. As the pressing action is repeated by subsequent sets of rollers 18 and 19, it extends over a larger range of temperature drop, which results in a positive seal leaving no gaps or leaks or passages even along folding edges.

While the term "portions" is used herein to designate consecutive portions in the direction of travel of the sealing band being treated, the term "zone" is used to designate areas adjacent to each other in a direction at a right angle to the direction of travel.

After passing through this station 2 the cartons, moved by the plunger 6, pass continuously into the bending station 3. This station has several pairs of rollers, the upper rollers 27, 28, 29 (see Figure 4), being arranged on cross bearings 23 and these too are located on the axis of shaft 24 and are capable of being swung upwardly. The upper rollers 27, 28, 29 and the lower rollers 30 are driven with respect to one another by toothed wheels 31, 32. The possible swinging movement of each upper roller is adjustably limited by a stop screw 33. The rollers 27, 28, 29 have different angles of conicality, as can be seen from Figure 4 and as a carton is passed therebetween they bend down the sealing bands of the cartons over the lower rollers 30 in three stages.

Figure 4:
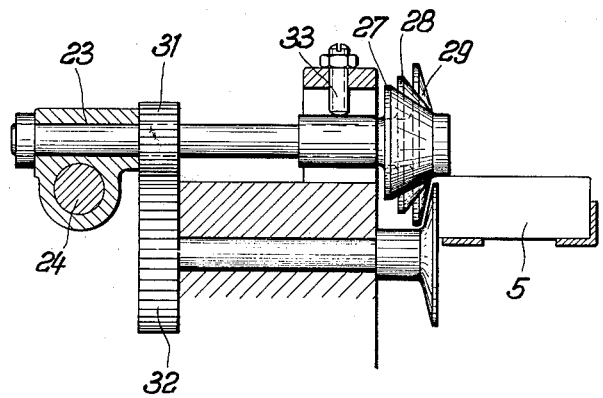
Figure 4 is a similar view of the bending device.

As shown in Figure 4, the bending is effected along a line offset from the root of the sealing band, the distance being somewhat more than the width of the sealed zone. This enables the sealed zone of the sealing band to remain in its relative position with respect to the container body, so as to prevent damage to the seal due to unequal stress in the individual sealed layers, which would result if the folding line was located within the sealed zone.

On leaving the first bending station 3, the cartons are moved by thrust members 34 of a chain 35 and passed to the final folding station 4. Here two double cone rollers 36, 37, which are carried rotatably on spindles 38 and which are inclined at an angle to one another, act on the containers. As will be seen from Figure 5, the conical surfaces of roller 36 are at an angle of somewhat less than 90°, so that when upper conical surface 36a is in line contact with the top of the container, lower conical surface 36b is somewhat inclined with respect to the adjacent container wall. Thus, roller 36 will, in operation, fold the sealing band into a position in which the sealed zone remains, for purposes mentioned before in the position in which it had been sealed, while the extreme edge of the sealing band is closely adjacent to, or substantially in contact with the adjacent container wall. The force applied to the container by roller 36 and directed at a right angle to the direction of travel is counteracted by roller 37 having its two conical surfaces arranged substantially at a right angle so as to apply a final shaping action to the container edge opposite to the sealing band.

It should be appreciated that the invention is capable of various modifications. It can, for example, be applied to containers prefolded in a manner that the sealing band projects from a wall of the container at a location intermediate of the edges as distinguished from the illustrated example in which the sealing band projects from a container wall along an edge thereof. Heating elements 8 and 9 and rollers 18 and 19 would then be substantially identical to those shown in Figures 2 and 3, respectively, while the rollers of the bending and final folding stations (Figures 4 and 5) would be of a suitably modified shape to insure, in any case, that the sealed zone is not subjected to bending or other deformation capable to break the seal.

Figure 5:
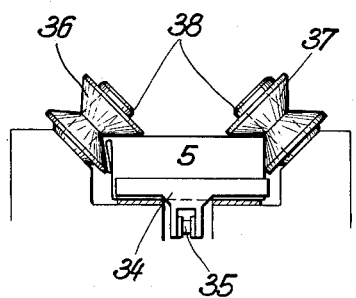
Figure 5 is a cross-sectional view of the final folding device.

This arrangement can be seen in detail in Figure 5. The purpose of the roller 36 is to fold the sealing band 7 at an acute angle against the carton in order to make it lie neatly. The roller 37 insures that one edge of the carton remote from the sealing band is subjected to a final rectangular shaping action.

The invention is not limited to the construction shown and described. For example, the drive for operating the heating element 8 may consist of means other than a cam drive; such as, for example, rods and/or toothed wheels. The arrangement may also be such that both heating elements are movable relative to one another. Also the bearings for, and the range of movement of the rollers 18, 19 and the number of pairs of rollers may be changed. These variations may also be applied to the rollers of the bending station 3. Finally, the processes of final shaping of the edge of the carton remote from the sealing band, may be done at some other time, instead of simultaneously with the final folding of the sealing band as shown. The rollers 36, 37 may be provided with a separate drive if desired. Under some conditions, the folding by the rollers 36 may be omitted and this work be done by the last pair of rollers of the bending station 3.

This application is a continuation-in-part of our application Serial No. 396,602, filed December 7, 1953, for "Process and Apparatus for Closing Cartons by Heat Sealing," now abandoned.

Having now described the means by which the objects of the invention are obtained, we claim:

1. Apparatus for sealing the layers of the sealing bands of containers in which the said sealing bands have portions made up of varying numbers of layers coated with a thin layer of thermoplastic material, comprising a heating station for heating the prefolded sealing band and simultaneously pressing its layers into parallel relation, said heating station comprising at least one pair of parallel rigid heating elements; a pressing and sealing station for repeatedly applying pressure to a narrow zone of the sealing band, to provide a positive seal between the surfaces of any two adjacent sealing band layers, regardless of variations in the number of layers present in the sealing band or differences of sealing band total thickness and angular extension of the folding edges of the edge bands within the sealing band with respect to the sealing band, and thus prevent relative displacement of the layers within the sealed zone; said pressing and sealing station comprising pairs of cooperating rollers arranged at opposite sides of the sealing band, one of said elements being spring biased against the other and the peripheral surface edges of both elements being preferably narrow to effect sealing along said narrow zone; a progressive bending station for bending the sealing band in stages toward an adjacent container wall with said sealing band being bent along a non-sealed zone farther remote from the body of the container than the sealed zone, said progressive bending station comprising pairs of cooperating rollers having conical surfaces and being arranged at opposite sides of the path of the sealing band, the angle of inclination of the conical surfaces of subsequent pairs of rollers being progressively increased, and the peripheral surface of the lower rollers having a cylindrical portion the width of which is at least substantially equal to the width of the actually sealed zone; and a final folding station for folding the sealing band against said adjacent wall preferably along a line farther remote from the container than said sealed zone, said folding station comprising two rollers one of which folds the sealing band against the adjacent wall while the other counteracts the force exerted by said first roller on the container in a direction perpendicular to the path of the container.

2. Apparatus for sealing the layers of a sealing band of a container in which said sealing band has portions made up of varying numbers of layers coated with a thin layer of thermoplastic material comprising a heating station composed of a pair of parallel rigid heating elements for simultaneously heating and pressing said sealing band into approximate parallel relation without producing a gas-tight closure between the layers in the band, and a pressing and sealing station immediately adjacent said heating station and composed of pairs of unheated cooperating rollers spring-biased toward each other with the spring bias on one of said rollers in each pair of rollers being stronger in any pair of rollers than in the pair preceding with respect to the direction of movement of the sealing band through the pressing and sealing station for repeatedly applying pressure of increasing strength to the sealing band to provide a positive gas-tight seal between the surfaces of any two adjacent sealing band layers regardless of variations in the number of layers present in the sealing band or differences of sealing band total thickness and angular extension of the folding edges of the layers within the sealing band.

References Cited in the file of this patent

UNITED STATES PATENTS

| | | |
|---|---|---|
| 2,218,585 | Merkle | Oct. 22, 1940 |
| 2,229,542 | Allison | Jan. 21, 1941 |
| 2,287,957 | Allen | June 30, 1942 |
| 2,625,778 | Wood | Jan. 20, 1953 |
| 2,669,167 | Behl | Feb. 16, 1954 |
| 2,764,283 | Stanton | Sept. 25, 1956 |